United States Patent [19]

Le Noane et al.

[11] Patent Number: 5,318,612
[45] Date of Patent: Jun. 7, 1994

[54] METHOD FOR PRODUCING OPTICAL FIBER PREFORMS AND DEVICE TO IMPLEMENT SAID METHOD

[75] Inventors: Georges Le Noane, Trogastel; Isabelle Hardy, Louannec, both of France

[73] Assignee: France Telecom Etablissement Autonome de Droit Public, France

[21] Appl. No.: 897,315

[22] Filed: Jun. 11, 1992

[30] Foreign Application Priority Data

Jun. 21, 1991 [FR] France .............................. 91 07669

[51] Int. Cl.$^5$ ........................................ C03B 37/025
[52] U.S. Cl. ..................................... 65/3.12; 65/11.1; 65/30.1
[58] Field of Search ............. 65/3.12, 30.1, 3.2, 65/11.1

[56] References Cited

U.S. PATENT DOCUMENTS

| | | | |
|---|---|---|---|
| 3,540,870 | 11/1970 | Li ........................................ | 65/11.1 |
| 4,191,545 | 3/1980 | MacChesney et al. .............. | 65/3.12 |
| 4,233,052 | 11/1980 | Dominick et al. .................... | 65/144 |
| 4,257,797 | 3/1981 | Andrejco et al. .................... | 65/3.12 |
| 4,302,230 | 11/1981 | MacChesney et al. .............. | 65/3.12 |
| 4,402,720 | 9/1983 | Edahiro et al. ....................... | 65/3.12 |
| 4,412,853 | 11/1983 | Partus .................................. | 65/3.12 |
| 4,576,622 | 3/1986 | Jung .................................... | 65/13 |
| 4,666,488 | 5/1987 | Mizutani et al. ..................... | 65/3.12 |
| 4,944,244 | 7/1990 | Moisan et al. ....................... | 118/723 |
| 4,952,225 | 8/1990 | Le Sergent et al. ................. | 65/3.12 |
| 5,000,773 | 3/1991 | Le Noane et al. ................... | 65/3.12 |
| 5,169,422 | 12/1992 | D'Annessa et al. . | |

FOREIGN PATENT DOCUMENTS

| | | |
|---|---|---|
| 227846 | 11/1985 | European Pat. Off. . |
| 3222189 | 1/1984 | Fed. Rep. of Germany . |
| 3440900 | 5/1986 | Fed. Rep. of Germany . |
| 3619379 | 12/1986 | Fed. Rep. of Germany . |
| 2314151 | 5/1976 | France . |
| 2575151 | 12/1984 | France . |
| 2576693 | 1/1985 | France . |
| 2589461 | 10/1985 | France . |
| 2600327 | 6/1986 | France . |
| 2019383 | 10/1979 | United Kingdom . |
| 2172885 | 10/1986 | United Kingdom . |
| 2192698 | 1/1988 | United Kingdom . |

OTHER PUBLICATIONS

Production of Optical Fibres based on the PCVD Process by G. Kuyt et al., published in Philips Telecommunication Review, vol. 46, No. 2, Jun. 1988, pp. 1 to 12.
Le Procede de Fabrication M.C.V.D. by J. L. De Vaulchier, published in Toute L'Electronique, No. 504, May 1985, pp. 64 to 67.
12th European Conference on Optical Communication 22-25 Sep. 1986, Palacio de Congresos, Barcelona Spain, Technical Digest, vol. 1, pp. 19-22.
Optical Fiber Communication Conference and Sixth International Conference On Integrated Optics and Optical Fiber Communication Technical Digest, Jan. 19-22 1987, Reno Nevada, p. 105.
Patent Abstracts of Japan, vol. 12, No. 387 (C-536) (3234) Oct. 14, 1988, showing JP-A-63 134 529 (Fujikura Ltd.) Jun. 7, 1988.

*Primary Examiner*—Robert L. Lindsay
*Attorney, Agent, or Firm*—Pearne, Gordon, McCoy & Granger

[57] ABSTRACT

According to the invention, a hollow silica bar (2) is produced with a thick wall and high geometrical precision, the bar is then cleaned and an oven (24) is used able to heat the silica to its melting temperature and with respect to which the bar is moved so as to embody an external thermic glazing of the bar, an internal vapor phase depositing a vitreous coating in this bar by making circulate inside it a mixture of suitable gaseous constituents, this coating being intended for the subsequent formation of the core of the optical fibers, and an area contraction of the bar, the various temperatures of the bar required to embody these operations being obtained by varying the temperature of the oven or speed of the bar with respect to the oven.

20 Claims, 2 Drawing Sheets

METHOD FOR PRODUCING OPTICAL FIBER PREFORMS AND DEVICE TO IMPLEMENT SAID METHOD

FIELD OF THE INVENTION

The present invention concerns a method and device for producing preforms for optical fibers.

It applies more particularly for the production of monomode optical fibers, but may also be applicable for the production of multimode optical fibers.

BACKGROUND OF THE INVENTION

Existing methods to produce preforms for optical fibers are divided into two categories:

"external" methods making use of flame hydrolysis techniques, and

"internal" methods making use of a vapor phase oxidation reaction.

These existing internal methods use an internal vapor phase deposit inside a thin-walled silica tube (such as a tube with dimensions of 19×25, that is a tube whose internal diameter is 19 mm and external diameter is 25 mm) and have at least one of the following drawbacks:

optical fibers embodied from preforms obtained by these methods are relatively costly, these optical fibers do not have extremely accurate geometrical characteristics, which in particular impairs the development of methods for connecting optical fibers, these methods being simple and less expensive to implement.

In particular, there exists a method frequently used for the production of preforms for optical fibers.

This method, known as a "modified chemical vapor deposition" method or MCVD, consists of coating the internal face of a thin-walled silica tube (conventionally a tube with dimensions of 19×25) with a suitable vitreous coating by means of a vapor phase oxidation reaction.

The tube and the vitreous coating formed inside this tube are slightly thick owing to the heating device used for attaining a sufficient and localized temperature for the oxidation reaction.

This heating device is a welding torch which actually has two drawbacks.

One first drawback is the difficulty of heating the inside of the tube through the dielectric of this tube by the heating device in question, whereas in order to deposit a good quality vitreous film, it is necessary to attain a sufficient temperature inside the tube without at the same time inducing an area contraction or collapse of the tube prejudicable to the proper laying of the deposit at this stage of the MCVD method.

One second drawback resides in the fact that the silica outside the tube evaporates when in contact with the flame of the welding torch when implementing the MCVD method.

So as to slightly mitigate these drawbacks and increase the capacity of a preform obtained by this MCVD method, an internal counter-pressure is generally used, which prevents any premature subsidence of the tube and thus makes it possible:

to use tubes whose internal diameter is slightly larger than the one indicated earlier and is, for example, 26 mm, hence a larger tube section for a given dielectric thickness and/or depositing an internal vitreous film whose thickness is slightly larger that the admissible thicknesses with the "ordinary" MCVD method mentioned above.

Despite these improvements, the MCVD method can only be implemented with thin-walled tubes.

Another known technique to increase the capacity of the produced preform and thus lower the production cost of optical fibers from this preform consist of:

treating a first tube by the MCVD method and of then carrying out the operation for contracting or collapsing the area of this first tube and then attaching a second silica tube to this first tube and then of simultaneously contracting the area of the two tubes.

This other known technique nevertheless remains one delicate to implement and is relatively limited by the thickness of the deposit in the first tube.

There is also another technique which, after collapsing the area of the tube containing the internal deposit, consists of "recharging" the bar obtained, for example with the aid of a plasma torch able to produce by direct fusion vitrified silica via the projection of grains of natural silica, or is able to embody a deposit of films of synthetic pure silica or doped by fluorine.

Apart from the fact that such operations do not always improve efficiency as they involve tool changes, they are generally cumbersome to implement and still have the drawback of starting with a thin-walled tube, a tube which is generally produced by extrusion or ingot drawing systems whose geometrical precision is relatively slight.

The same limitations appear when other heating means are used through the thin-walled tube.

This applies particularly to the PCVD method ("Plasma Chemical Vapor Deposition") using a plasma generated by a microwave cavity, the only difference being the capacity (allowed by the fact that the depositing takes place at a lower temperature than in the MCVD method) for embodying extremely thin vitreous films and doping more easily these films with fluroine, the combination of these two effects opening more possibilities for embodying accurate and varied optical index profiles.

The document FR-A-2 600 also describes another method for producing a preform for optical fibers.

This other known method has the advantage of starting with pierced high precision wide bars.

However, it does have the disadvantage of embodying the internal deposit with the aid of a plasma column maintained by a direct wave injected with the aid of a ultrahigh frequency coupler connected to a microwave generator.

In fact, if the injection of this direct wave and obtaining of the plasma column, whose length may be modulated by modulating the electric power of the microwave generator used, are advantageous as they are relatively independent of the thickness of the dielectric of the pierced bar, it still remains difficult to obtain:

a correct longitudinal regularity for the deposition of thin films similar to those obtained by the PCVD method, and a suitable longitudinal regularity of the desired optical index for these films.

Moreover, the length of the deposit is limited by the length of the plasma column which itself is linked to the power of the generator.

Thus, this other known method does have drawbacks, namely:

obtaining a deposit whose geometrical regularity is relatively poor and an optical index profile whose regularity is also relatively poor, which unfortunately is opposed to the advantage of starting with high-precision pierced bars, and obtaining preforms whose capacity is relatively highly limited, which affects the economic advantage of the method.

SUMMARY OF THE INVENTION

The present invention is able to resolve these drawbacks.

It concerns a method and device for producing preforms for optical fibers, this method and device being relatively inexpensive in embodying and providing extremely high geometrical precision for the fibers derived from these preforms.

More specifically, the present invention firstly concerns a method for producing a preform for optical fibers, wherein it includes the following successive stages:

a thick-walled high geometrical precision hollow silica bar is produced, this bar is cleaned, and an oven is used able to heat the silica to its melting temperature and with respect to which the bar undergoes relative displacements so as to proceed with carrying out the following successive operations:

an internal and external thermic glazing of the bar, an internal vapor phase depositing of a vitreous coating in this bar with the aid of a mixture of gaseous constituents made to circulate inside the bar, these constituents being suitable for generating the coating by reacting together, this vitreous coating being intended for the subsequent formation of the core of the optical fibers, and an or collapse of the bar, the various temperatures of the bar required for the carrying out of these operations being obtained by varying the temperature of the oven or the relative speed of the bar with respect to this oven.

A "thick-walled hollow bar" is understood to be a tube whose thickness is extremely wide and is at least 15 mm, that is much larger than the thickness of the thin-walled tubes used for implementation of the MCVD method.

A "hollow bar with high geometrical precision" is understood to be a hollow bar which after machining has:

a known nominal precise internal diameter with a tolerance of less than 0.01 mm, a known nominal precise external diameter with a tolerance of less than 0.01 mm, and excellent concentricity, that is about 0.01 or less, between the internal wall and external wall of the hollow bar.

This hollow bar may, for example, be made by machining (piercing and lapping) from silica ingots or extremely thick silica tubes obtained by drawing or extrusion, the excellent concentricity mentioned above then being inherent in the machining methods employed.

The vitreous coating to be used for the subsequent formation of the core of the optical fibers is a set of pure or doped silica films, depending on the nature of the hollow bar (which itself may be made of pure or doped silica).

The method of the invention may also include a chemical attack of the internal surface of the bar after or during the thermic glazing prior to internal deposition.

This chemical attack makes it possible to fully complete the cleaning of the hollow bar and improve catching of the vitreous coating which, by virtue of this chemical attack, has virtually no interface ball.

The hollow bar is preferably cooled downstream of the circulation of the mixture of the gaseous constituents making it possible to obtain the vitreous coating.

This makes it possible to increase the effectiveness of the operation for depositing internal vitreous coating films.

In fact, this cooling increases the thermophoresis effect, which amounts to increasing overall deposit efficiency.

The production of the bar is preferably completed by machining a cone at one extremity of this bar and along the axis of the latter and the mixture of the gaseous constituents penetrated into this bar via the other extremity of the latter.

Apart from other things, this facilitates the flow of the gaseous flows (resulting from the mixture of gaseous constituents) downstream of the internal deposit.

According to one preferred embodiment of the method of the invention, coaxial to the bar and on the side of the machined cone, a thin-walled silica tube is also connected to the bar, the internal diameter of this tube being equal to the diameter of the large base of the cone.

Apart from other things, this makes it possible to facilitate deposition and the evacuation of any residual soot resulting from this deposition.

The production of the bar is preferably completed by coaxially connecting to this bar and a bar extremity one extremity of an auxiliary hollow silica thick-walled bar having roughly the same internal diameter as the produced bar, and the mixture of gaseous constituents penetrates into this auxiliary bar via the other extremity of the latter.

Apart from other things, this makes it possible to receive in this auxiliary hollow bar the start of the deposit, which, generally speaking, is not homogeneous.

The present invention also concerns a device for producing a preform for optical fibers, wherein it includes:

an oven a support, means for the relative alternate displacement of the support with respect to the oven and for controlling the speed of this relative movement, means for maintaining a thick-walled hollow high precision silica bar, these means being mounted on the support on both sides of the oven so as to enable the bar to traverse this oven, means for the synchronous rotation of the holding means so as to make the bar rotate around the axis of this bar, means for controlling the temperature of the oven, this oven being able to heat the silica to its melting temperature, and means for circulating in the bar a mixture of gaseous constituents able to interact and generate a vitreous coating on the internal wall of the bar, said coating intended for the subsequent formation of the core of the optical fibers so that, by means of the oven and after cleaning of the bar, it is possible to successively carry out an internal and external thermic glazing of this bar, a vapor phase deposition of the vitreous coating in this bar and an area collapse of this bar.

As indicated in the invention, the movements used are relative movements: the hollow bar may be moved with respect to the oven or, on the other hand, the oven may be moved with respect to the bar.

Moreover, so as to carry out the operations mentioned above (thermic glazing, possible chemical attack, internal deposition and area contraction), it is possible to keep constant the relative speed of the bar with respect to the oven and vary the temperature of this oven so as to obtain the various temperatures of the bar (in particular at the internal surface of this bar) required for the carrying out of these operations or, on the other hand, keep constant the temperature of the oven and vary the relative speed of the bar with respect to the oven so as to obtain these various temperatures.

It is also possible to keep constant the relative speed of the bar with respect to the oven and vary the temperature of this oven so as to obtain the various temperatures of the bar required for carrying out some of these operations and, for the other operations, keep the temperature of the oven fixed and adapt the relative speed of the bar with respect to the oven so as to obtain the various temperatures of the bar required for carrying out these other operations.

The device of the invention thus makes it possible to carry out various operations required for obtaining the preform without dismantling the bar.

The thermic glazing makes it possible to complete the internal and external surfaces of the bar after the latter has been machined and cleaned.

In the invention, the depositing of the films of the vitreous coating takes place via an oxidation reaction similar to the oxidation reaction occuring when implementing the MCVD method mentioned above.

Moreover, in the present invention, the area collapse of the hollow bar provided with its internal deposit is embodied more effectively than with a conventional area collapse which is obtained with a welding torch for thin tubes.

In the present invention, this area contraction is possible by means of the thermic supply of the oven which is able to heat the entire bar to a sufficiently high homogeneous temperature.

The extreme effectiveness of this area collapsing operation is possible by means of:
the use of the oven as a heating device,
the excellent concentricity of the internal and external walls of the machined bar, and
the considerable regularity of the internal deposit, this being possible by virtue of the homogeneity and stability of the deposition temperature and the excellent geometrical regularity of the internal diameter of the bar.

Contrary to the case with known techniques, the present invention makes it possible to deposit a vitreous coating on the internal wall of a machined thick hollow bar and, without dismantling this bar, is able to embody a high effective collapsing ending at an extremely homogenous precise preform whose core diameter and outer diameter are perfectly concentric.

This thus results in having:
a production speed in km/hour of equivalent fibers clearly greater than the fibers obtained with traditional methods for embodying an internal deposit on a thin-walled tube, and extremely high production efficiency by virtue of the conjunction (a) of an extremely low attenuation corresponding to a fully controlled CVD deposit, (b) of a considerable extremely homogeneous mechanical resistance from a bar able to be elaborately embodied prior to fiber orientation, and (c) considerable accuracy concerning the opto-geometrical parameters.

Accordingly, this means in obtaining high-performing optical fibers
whose low production cost is even accentuated by a relatively low investment as regards the high-performing production device of the invention, and
whose opto-geometrical characteristics are extremely precise, which favors the development of extremely simple connection techniques.

The oven used in the present invention may be an induction oven.

This induction oven may include a graphite or even a zircon susceptor.

According to one preferred embodiment of the device of the invention, this device further includes means for cooling the bar downstream of the circulation of the mixture of gaseous constituents for the reason mentioned earlier.

These cooling means are preferably fixed against the oven.

These cooling means may include:
a tubular body provided with cooling blades and intended to be traversed by the bar, and
channels for feeding a cooling gas, these channels being formed in the tubular body, so as to feed this gas into the tubular body.

The cooling gas feed channels are preferably slanted downstream of the circulation of the mixture of gaseous constituents.

BRIEF DESCRIPTION OF THE DRAWINGS

The present invention shall be more readily understood from a reading of the following description of embodiment examples, given solely by way of indication and being in no way respective, with reference to the accompanying drawings on which.

DETAILED DESCRIPTION OF THE PREFERRED EMBODIMENTS

Figure 1:
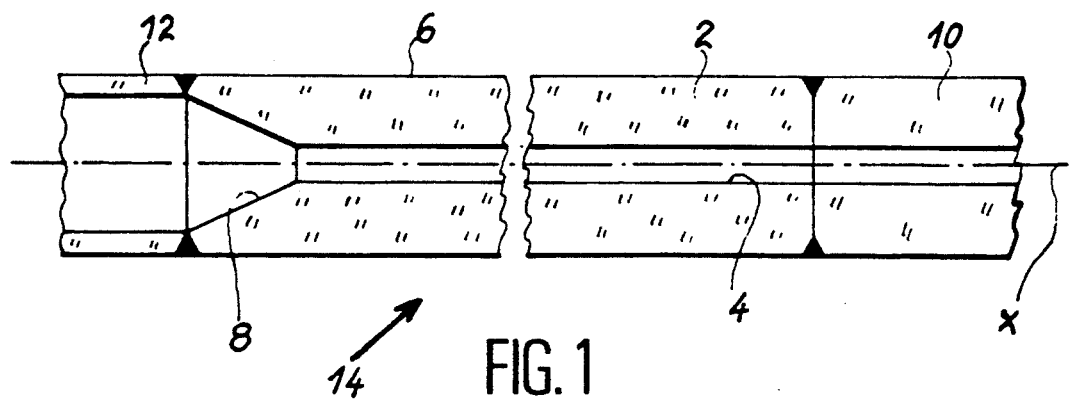
FIG. 1 is a diagrammatic view of a welded unit including a machined hollow thick-walled high-precision silica bar inside which it is desired to deposit a vitreous coating in accordance with the invention, one auxiliary hollow ordinary silica bar having the same internal diameter and same external diameter as the preceding bar, and one ordinary thin-walled silica tube.

FIG. 1 diagrammatically shows a machined thick-walled hollow silica bar 2 adapted to the method for producing a preform for optical fibers and conforming to the present invention.

This hollow bar 2 made of natural or synthetic silica is obtained by machining (piercing and lapping) so that its nominal internal diameter is known and obtained with a tolerance of less than 0.01 mm and that its nominal external diameter is known and obtained with a tolerance of less than 0.01 mm and also that the concentricity of the internal wall 4 and of the external wall 6 of the bar 2 is almost perfect (that is, about 0.01 or less) as allowed by current machining machines, with in particular a machining of the external diameter from of an extremely accurate centering concerning the internal diameter carried out by the machine.

The hollow bar 2 may be made of pure silica or doped silica, for example doped with fluorine, or, for specific reasons concerning the final structures of optical fibers, may consist of a combination of pure silica and doped silica.

This hollow bar 2 is machined either directly from an ingot of this silica, which results, for example, from implementing an inexpensive method such as axial thrust by a plasma torch, or from a hollow bar which is extruded or drawn or which results from implementing a method, such as a lateral thrust by a plasma torch on a substrate tube, and which owing to this has relatively less precise dimensions (external and internal diameters), for example tolerances of about ±2 mm concerning these internal and external diameters.

However, in all cases, the bar 2 is constituted by relatively good quality silica whose mechanical resistance is high but extremely economical.

The aim of the machining operation is to produce an extremely accurate hollow bar, a notion which is absent in conventional techniques for producing preforms for optical fibers, techniques which are used to make thin-walled tubes.

A thin-walled tube has, for example, a nominal internal diameter of 19 mm and a nominal external diameter of 25 mm.

The precision generally accepted for different tubes concerning the section of these tubes is 4%.

In still considering several tubes, this means that the variation concerning the nominal diameters may reach several tenths of mm with also repercussions concerning the concentricity between the internal wall and external wall of these tubes.

For a given tube, precision is clearly better, but generally speaking, remains at a level of tolerance equal to 0.5 mm concerning the internal and external diameters and to 1% concerning the section.

The concept of machined hollow bars is completely different from this concept of thin-walled tubes.

By way of example, the machined hollow bars used in the present invention may have an external diameter equal to 70 mm and an internal diameter selected from a range extending from 25 to 30 mm.

Thus, it can be understood that the thickness of the silica wall of 2 or 3 mm for a thin-walled tube able to be used in the MCVD method, extends, for example, to 20 mm for a machined hollow bar able to be used in the present invention.

In a cross section, the surface of the silica therefore extends from 217 mm$^2$, for a tube with dimensions of 19×25 able to be used in the MCVD method for example, to 3140 mm$^2$ for a machined hollow bar with dimensions of 30×70 able to be used in the present invention and whose cross section thus has a surface about 14 times larger.

The notion of machined hollow thick-walled bars is then characterized by a machining tolerance easy to obtain by current machining machines and less than 0.01 mm.

Given the fact that the nominal diameter is fixed by the machining dimension, precision included on several bars is obtained concerning the cross section which is about $0.5 \times 10^{-3}$ instead of $4 \times 10^{-2}$ (mentioned earlier) for thin-walled tubes, namely a progression of almost two orders of magnitude for precision.

It shall be subsequently seen that the consequences of this notion of thick machined hollow bars associated with the heating device (an oven) used in the invention are considerable.

The operation for machining the hollow bar is possible due to the large thickness of the wall of this bar, whereas the machining of a thin-walled tube is extremely delicate, indeed impossible.

Moreover, the increase of the cross section when a thin-walled tube is replaced by the thick-walled hollow bar, this implies an increase of the same proportions of the capacity of the preform for a tube with the same length as the bar.

Thus, the cost of machining thin-walled tubes, while admitting that this machining is possible, would be prohibitive, whereas it is fully acceptable, indeed negligible, for the thick-walled hollow bar and which may enable a preform to be obtained whose capacity is 250 km/bar meter.

So as to implement the method of the invention, hollow bars may be used whose length is between 1.2 and 1.5 m, and the preforms obtained from these bars may enable 350 km of optical fibers to be produced following the internal deposition of a quantity of extremely pure silica (possibly doped), which, with the intention of producing extremely inexpensive monomode optical fibers, is reduced to the strictly minimum value so as to attain extremely low optical attenuations.

In order to implement the method of the invention, machined thick-walled bars are thus produced at a lower cost with a quantity of silica proving to be insufficient so as to directly constitute the core of the optical fibers, but proving to be sufficient in order to be able to reduce the portion deposited inside the bar to a strict minimum compatible with the sought-after quality for the optical fibers.

With reference again to FIG. 1, it is possible to complete machining of the thick-walled hollow bar 2 by embodying a cone 8 or "outlet cone" at the extremity of the bar 2 opposite the one via which the mixture of gaseous constituents for forming the internal vitreous coating shall arrive.

The axis of this cone 8 is merged with that of the bar 2.

The purpose of this outlet cone 8 is to facilitate the flowing of the gases downstream of the deposit which is then formed in the hollow bar and, in particular, to be able to simply embody at this extremity of the hollow bar 2 where the cone 8 is located a thermic supply—for example, with the aid of a welding torch—so as to avoid the cold thermic point effect and the creation of an excess deposit of soot adversely affecting the proper running of the complete deposition operation.

Purely by way of indication and being non-restrictive, the half-angle at the top of the cone 8 is 30 degrees.

As shown on FIG. 1, it is also possible to weld at the other extremity of the hollow bar 2 (and thus upstream of the deposit) an auxiliary thick-walled hollow bar 10 made of ordinary silica and having the same axis X as the hollow bar 2 and roughly the same internal diameter as the latter (so as to obtain a good flowing of the gases used for formation of the internal vitreous coating).

It is also possible to weld to the extremity of the hollow bar 2 where the inlet cone 8 is located a thin-walled tube 12 made of ordinary silica having the same axis as the hollow bar 2 and whose internal diameter is roughly equal to the diameter of the large base of the outlet cone 8.

The unit constituted by the outlet cone 8 and the tube 12 thus forms downstream of the deposit a chamber whose internal diameter is larger than the internal diameter of the hollow bar 2, which facilitates deposition and evacuation of any residual soot.

The external diameter of the tube 12 is preferably equal to the external diameter of the hollow bar 2 and the external diameter of the auxiliary hollow bar 10 is also roughly equal to the external diameter of this hollow bar 2 so as to be able to use identical chucks in the device, all this to be later described with reference to FIG. 2.

The auxiliary bar 10 and the tube 12 thus have functions which contribute in rendering inexpensive the production of a preform for optical fibers from the hollow bar 2.

The operations for welding the auxiliary bar 10 and the tube 12 are extremely simple and less costly.

Figure 2:
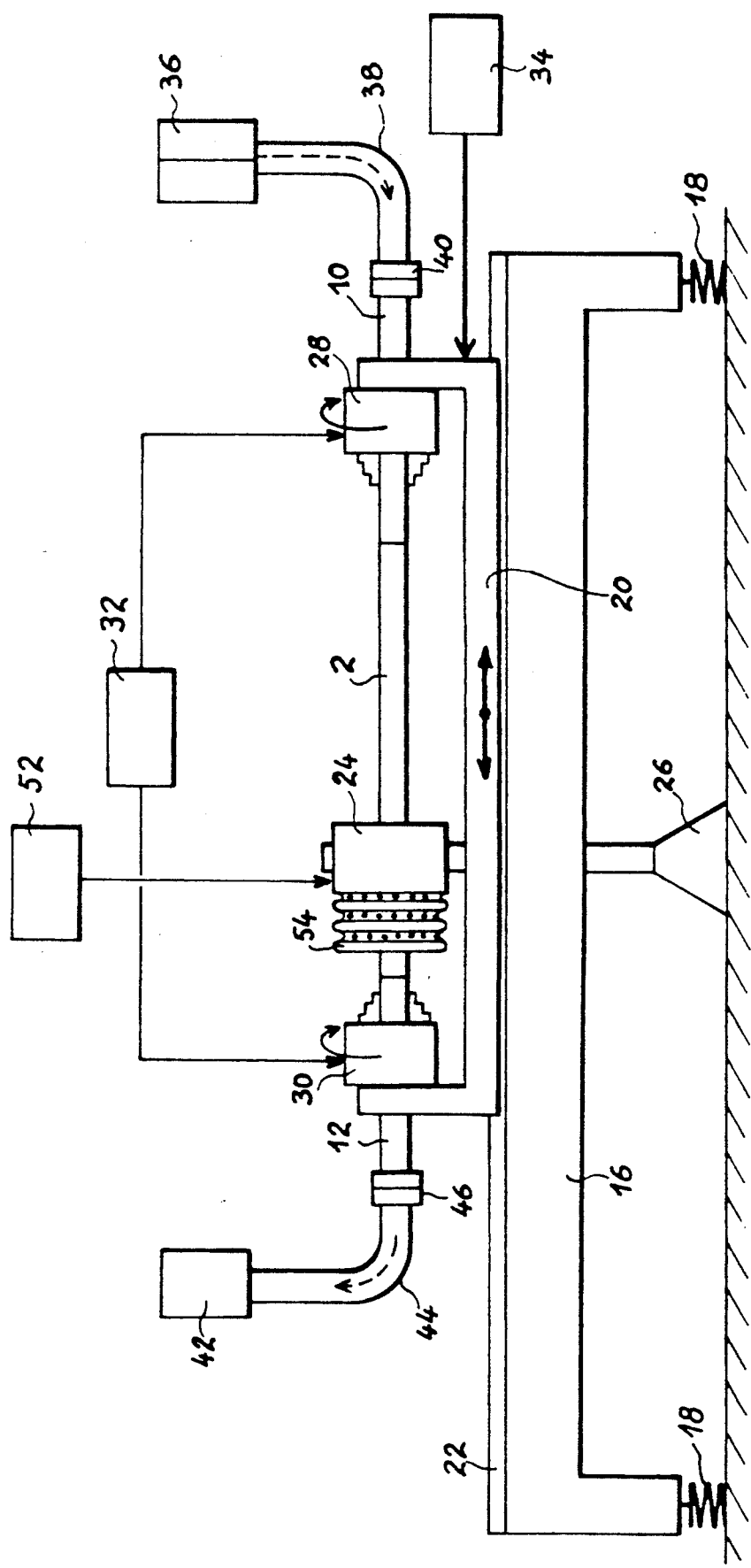
FIG. 2 is a diagrammatic view of one particular embodiment of the device of the invention.

Moreover, FIG. 2 shows that the auxiliary bar 10 and the tube 12 allow for holding up of the unit 14 constituted by this bar 10, the tube 12 and the bar 2 in the chucks of the device shown on FIG. 2 (the respective lengths of the bar 10 and the tube 12 being sufficient in order to achieve this), while guaranteeing:

a regular rotation during the deposition operation, a suitable flow used for forming the deposit upstream of this deposit by virtue of the internal diameter continuity, and the deposition and evacuation of any residual soot in a chamber with a larger diameter downstream of the deposit.

Furthermore, by means of the auxiliary bar 10 and the tube 12, it is possible:

to avoid any excess depositing at the extremity of the hollow bar 2 where the outlet cone 8 is located, to receive in the auxiliary bar 10 the portion of the deposit start whose non-homogeneity is well-known for this type of deposition and known as "taper" in English publications.

In fact, as the auxiliary bar is made of ordinary silica and extremely inexpensive, this auxiliary bar 10 is able to receive this non-homogeneous portion whose length is generally relatively large (200 mm, for example) and which is able to be used for the production of optical fibers.

This non-homogeneous portion subsequently undergoes an area contraction or collapse with the unit of the "productive" portion of the deposit and may, from the economical point of view, advantageously constitute a start up portion for the fiber orientation operation due to the fact that it comprises a portion with a large amount of material, having regard to the dimensions of the preform.

It can be seen that the use of the auxiliary bar 10 and the tube 12 has a large number of advantages for the sound running of the operation for depositing an internal vitreous coating and the real production yield and, accordingly, as regards the final cost of the optical fibers obtained from the preform.

FIG. 2 shows one particular embodiment of the device of the invention.

The device shown on the diagram on FIG. 2 makes it possible to produce a preform for optical fibers from one single thick-walled hollow bar 2 or, even better, from the unit 14 comprising this hollow bar 2, the auxiliary bar 10 and the tube 12 described earlier.

When this unit 14 is used, the two chucks contained by the device shown on FIG. 2 respectively maintain the auxiliary bar 10 and the tube 12.

Of course, when treating the single hollow bar 2, these chucks would respectively support the extremities of this hollow bar 2.

The device diagrammatically shown on FIG. 2 includes:

one fixed rigid support 16 whose extremities are mounted on damping means 18, another rigid support 20 able to be translation-moved on a slide 22 contained on the support 16, an oven 24 which is mounted on a fixed support 26 and which is able to heat the silica to its melting temperature, and two coaxial chucks 28 and 30 mounted on the movable support 20 and located on both sides of the oven 24.

In the example shown on FIG. 2, these two chucks 28 and 30 are provided so as to respectively maintain the auxiliary bar 10 and the tube 12 belonging to the unit 14 of FIG. 1 whose axis X coincides with the common axis of the chucks 28 and 30 when this unit 14 is maintained by the chucks 28 and 30.

Moreover, these chucks 28 and 30 are able to move around their common axis so as to be able to make the unit 14 rotate around its axis X.

The device of FIG. 2 also includes means 32 provided to animate the chucks 28 and 30 with a continuous and synchronous movement of rotation around the common axis of the chucks 28 and 30 with a low rate of rotation of about ten revolutions per minute, for example.

The common axis of the chucks 28 and 30 is parallel to the axis along which displacement of the support 20 is effected.

The device of FIG. 2 also includes means 34 provided to control the alternate displacement of the support 20 at a specific speed and over a determined length, which depends on the length of the hollow bar 2 so as to be able to successively deposit the films of the internal vitreous coating of this bar 2.

The control means 34 include a back-geared motor (not shown) which drives a precision ball screw (not shown) allowing for the alternate displacement of the support 20 and thus of the bar 2 through the oven 14 suitably disposed to this effect.

Moreover, the device of FIG. 2 is provided with automatic stops (not shown) able to detect the extreme positions of the support when it is alternately displaced.

The device diagrammatically shown on FIG. 2 also includes known means 36 for implementing the MCVD method and which are provided to inject into the extremity of the auxiliary bar 10 furthest from the bar 2 a suitable gaseous mixture, for example composed of oxygen and silicon tetrachloride vapor, so as to obtain in the hollow bar 2 a coating of pure silica or, if desired, a coating of silica doped with fluorine, the preceding mixture being added with a doper in the form of fluorine or with a derivative of the latter.

A doping with germanium requires the addition of traces of $GeCl_4$ to the mixture in question.

The desired mixture is injected into the auxiliary bar 10 by means of a tube 38 connected to the auxiliary bar 10 by a sealed rotating connector 40.

The device of FIG. 2 further includes pumping means 42, also known, for implementing the MCVD method and which are provided for evacuating soot and gases (these gases result from the reaction of the constituents of the gaseous mixture used) at the extremity of the tube 12 furthest from the bar 2.

This evacuation is effected by means of a tube 44 connected to the tube 12 by means of a sealed rotating connector 46.

The oven 24 may be an induction oven comprising a susceptor 48 and a set of coaxial induction spires 50, these spires surrounding the susceptor.

The oven 24 may be an oven with a graphite susceptor used for the preform fiber orientation.

Instead of using a graphite susceptor oven, it is possible to use a zircon susceptor oven.

The length of the oven is, for example, equal to 350 mm, the length of the susceptor being 230 mm.

A knowledge of the nominal value of the external diameter of the hollow bar 2 and the extreme precision concerning this value allow for an extremely precise centering of this hollow bar 2 inside the oven 24 and more specifically inside the susceptor 48 of this oven 24, this susceptor being accurately machined.

For this centering, the oven 24 is provided with means (not shown) allowing for the adjustment of its position.

The oven 24 is also provided with means 52 for controlling the temperature of this oven.

There now follows an explanation of the production of an optical fiber preform from the unit 14 (FIG. 1).

The unit 14 is first of all cleaned as follows: cleaning with nitrohydrochloric acid and three rinsings with deionized water.

Of course, when using solely the bar 2, this process begins by cleaning this bar 2 as indicated above.

When the unit 14 is cleaned, it is placed inside the device shown on FIG. 2.

The hollow bar 2 then traverses the susceptor 48 of the oven 24 in which it is accurately centered, the chucks 28 and 30 respectively support the auxiliary bar 10 and the tube 12, and the tubes 38 and 44 are respectively connected to the auxiliary bar 10 and the tube 12.

Then there successively follows a thermic glazing of the external and internal surfaces of the hollow bar 2 and subsequently a chemical attack of the internal wall of the bar 2 followed by depositing of the various films of the vitreous coating 47 (see FIG. 3) and finally a simultaneous area contraction or collapse of the hollow bar 2 and the portion of the auxiliary hollow bar 10 between the hollow bar 2 and the corresponding chuck 28.

So as to carry out all these operations, the temperature of the oven is kept at a constant value and the displacement speed of the unit 14 is controlled so that the bar 2 and the portion of the auxiliary bar 10 mentioned above are heated to temperatures appropriate to these operations.

To this effect, the control means 34 are associated with a programmer (not shown) which makes it possible to suitably vary the rate of flow of the hollow bar 2 and the portion of the auxiliary bar 10 in which the start of depositing of the vitreous coating is formed through the oven 24 so as to obtain an internal vitreous coating deposition as regular as possible.

The precision of the centering of the hollow bar 2 in the susceptor 48 of the oven 24 in liaison with the high regularity of the thickness of the wall of this hollow bar 2 is essential and makes it possible to obtain extremely well-characterized uniform heating easily reproducible from the silica of the hollow bar 2.

With the device shown on FIG. 2, it is thus possible, by simply modulating the displacement speed of the rigid support 20, to obtain an extremely wide gradation of the temperature of the silica inside and outside the hollow bar 2, this gradation allowing for carrying out the various operations mentioned above, namely:

the thermic glazing of the internal and external faces of the hollow bar 2, the subsequent chemical attack prior to deposition of the vitreous coating, this chemical attack being possibly effected by a freon ($CCF_2Cl_2$) and oxygen mixture, the depositing of the various films of the vitreous coating, and the collapse of the hollow bar 2 and the portion of the auxiliary bar 10 between the bar 2 and the corresponding chuck 28.

The preform obtained is extremely homogeneous.

Similarly, during depositing of the vitreous coating 47, the modulation of the displacement speed of the support 20 makes it possible to reduce to its strict minimum the non-homogeneous portion of the deposit and confine this portion inside the auxiliary bar 10 so as to increase the real production efficiency of the preform.

In addition, the displacement speed of the support 20 is controlled between depositions of films of the vitreous coating so as to minimize the overall time of the operation.

Purely by way of indication and being non-restrictive, it is possible to use the following conditions for production of the preform:

the temperature of the induction oven 24 is kept at 2000° C.±2° C., during the vitreous coating deposition phase, the displacement speed of the support 20 is modulated around 30 to 40 mm/min: at the start of the deposition operation, while one portion of the auxiliary bar 10 is located in the oven 24, the speed progressively rises by 10 mm/min until it reaches a value of between 30 and 40 mm/min for a displacement length of about 100 mm so as to reduce the length of the non-homogeneous deposition zone and then this speed is stabilized at this value, after the depositing of each vitreous coating film, the rapid return of the movable support 20 occurs at a speed of about 300 mm/min or more, the thermic glazing is effected with a displacement speed of about 22 mm/min, when a chemical attack is made of the internal face of the hollow bar 2, this attack is effected at the same time as when effecting thermic glazing, the collapse operation is effected with a displacement speed of about 15 mm/min, and this collapse operation is effected in three or four successive passages, possibly by establishing, although this is not obligatory, a slight partial vacuum in the unit 14.

In these circumstances, with a machined hollow bar 2 whose external diameter is 70 mm and an internal diameter of 30 mm prior to depositing the vitreous coating, this results in having an efficiency rating of between about 50 and 60 g/min, that is a productivity of between about 50 and 60 km/hour of equivalent area contracted fibers, this being quite considerable with respect to conventional methods using thin-walled tubes and a welding torch whose efficiency rating varies between 1 and 5 g/min.

The considerable efficiency of the collapsing operation is possible via the joint use of a high-precision machined bar and an oven, which may be a susceptor graphite or zircon induction oven.

In fact, without the homogeneity of the thickness to be area contracted or collapsed, this homogeneity resulting from firstly the use of the machined hollow bar and secondly the regularity of the vitreous coating deposit and without the effect of a sufficient homogeneous temperature procured by the oven, this collapsing operation would result in obtaining mediocre results in terms of efficiency or geometrical regularity as regards the preform obtained and thus for the optical fibers produced or would even be impossible.

The creation of a slight vacuum in the unit 14 makes it possible to accelerate the collapsing operation and allows for closing of the hollow bar in, for example, two passages.

The thermic glazing of the internal and external faces of the machined hollow bar 2 may be made in one passage, avoids any more precise polishing type machining which proves to be long and costly, and renders the internal face of the bar 2 perfectly smooth and homogeneous.

The cleaning by chemical attack of the internal face of this hollow bar 2 may be made in one passage.

Instead of keeping constant the temperature of the oven throughout all the operations and of suitably varying the displacement speed of the support 20 for embodying these operations, it is possible to keep constant the displacement speed of the support 20 and suitably vary the temperature of the oven 24.

Another advantage of the use of the oven for all the operations is to be able to simply adjust the width of the heated zone according to the configuration of the susceptor 48 and the induction spires 50, which makes it possible to optimize deposit efficiency in the machined hollow bar with given dimensions.

So as to increase this deposit efficiency, which is expressed in g/min of high quality silica deposited in successive films, it is possible to provide the oven 24 with cooling means 54.

The aim of these cooling means 54 is to cool as effectively as possible the machined hollow bar downstream of the flow of the gases enabling the vitreous coating to be obtained.

By means of a phenomenon for improving thermophoresis, this makes it possible to further increase the deposit yield.

Without using these cooling means, the entire hollow bar 2 or at least one relatively long bar zone would progressively be heated to a relatively high temperature.

The use of the oven 24 is thus much more effective if the cooling means 54 are secured against this oven, these means then forming an integral portion of this oven.

Figure 3:
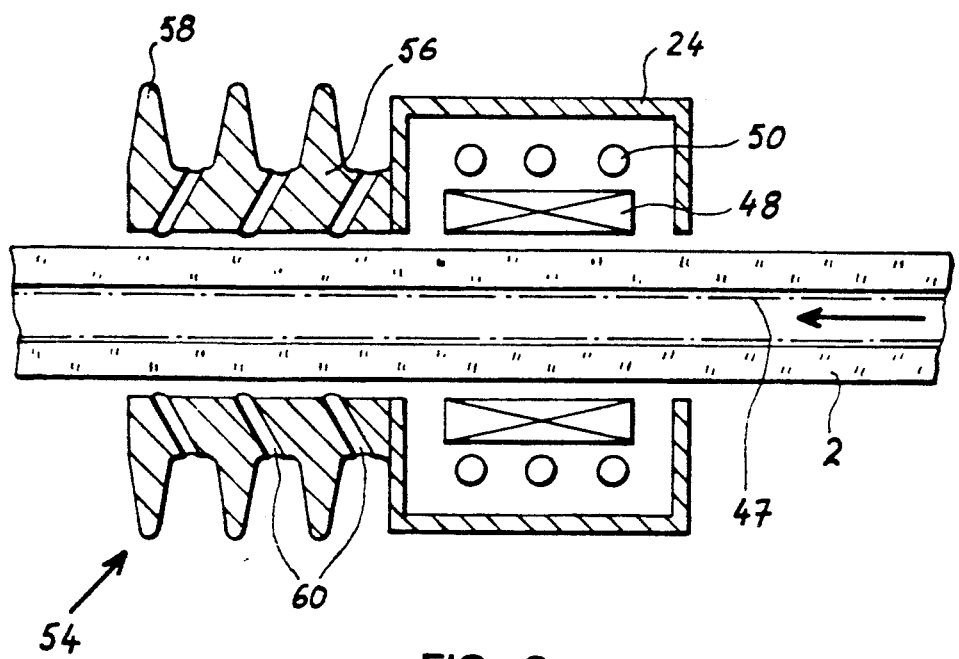
FIG. 3 is a diagrammatic view of an oven/cooler unit which the device comprises, diagrammatically shown on FIG. 2.

One embodiment example of these cooling means 54 is diagrammatically shown on FIG. 3.

In this example, these cooling means 54 include one metallic tubular body 56 whose external wall bears metallic cooling blades 58 and whose internal wall forms a black body facilitating the absorption of the heat given off by the hollow bar heated to a high temperature.

The body 56 is traversed by channels 60 distributed regularly around this body 56 and are provided to send to the hollow bar 2 jets of a gas, such as nitrogen, derived from means (not shown) and which cool the bar 2.

These channels 60 are preferably slanted towards the portion of the bar 2 corresponding to the downstream flow of gases resulting from the reaction which leads to the vitreous coating so as to rationally remove the cooling gas to this portion of the hollow bar 2.

Thus, by optimizing the zone width heated via the design of the oven susceptor, a sufficient calorific energy is supplied so as to attain the selected temperature for the hollow bar 2 and the cooling means 54 juxtaposed on the oven 24 limit the extension of this heated zone without adversely affecting or interfering with the functioning of the oven 24.

The present invention thus provides a method for producing preforms for optical fibers and using a known vapor phase deposition reaction with the aid of an oven advantageously incorporating cooling means.

This method makes it possible to produce preforms with an extremely wide diameter by virtue of a vitreous coating deposit in the machined high-precision thick-walled hollow bars. These preforms and thus the resultant optical fibers possess extremely high geometrical precision produced at an extremely low cost resulting from the combined use of less expensive machined bars and effective operations embodied in a single device, namely a thermic surface glazing, a vitreous coating deposit and an extremely effective area contraction.

The method of the invention is thus particularly adapted to the production of good quality inexpensive monomode optical fibers, thus forming a good compromise between the minimum quantity of silica to be deposited on the internal face of the hollow bar and the price/quality ratio of this machined hollow bar.

Of course, the method of the invention is also well-adapted to the production of low cost high-quality multimode optical fibers by selecting machined hollow bars with a suitable internal diameter.

What is claimed is:

1. Method for producing a preform for optical fibers, comprising the steps of:
   producing a hollow silica bar,
   cleaning the bar, and
   using an oven, which is traversed by the bar and heats the bar to a temperature equal to or above a melting temperature of silica and with respect to which the bar undergoes relative movements, for carrying out the following successive operations:
   thermic glazing of internal and external surfaces of the bar,
   depositing a vitreous coating on the internal surface of the bar by means of a mixture of gaseous constituents which are circulated inside the bar, wherein interaction of the gaseous constituents produces the vitreous coating, said vitreous coating being provided for the subsequent formation of a core of the optical fibers, and
   collapsing the bar, various temperatures of the bar required for the glazing, depositing, and collapsing steps being obtained by varying the temperature of the oven.

2. Method according to claim 1, further comprising a chemical attack of the internal surface of the bar after the thermic glazing step and prior to the depositing step.

3. Method according to claim 1, further comprising the step of cooling the bar downstream of the circulation of the mixture of gaseous constituents.

4. Method according to claim 1, wherein the step of producing the bar includes the steps of machining a cone at one extremity of the bar and along the axis of the bar and wherein the mixture of gaseous constituents enters the bar via an opposite extremity of the bar.

5. Method according to claim 4, wherein, coaxial to the bar at the side of the machined cone, a thin-walled silica tube is connected to the bar, an internal diameter of the tube being equal to a diameter of a large base of the cone.

6. Method according to claim 1, wherein production of the bar is completed by connecting, coaxial to the bar and at one extremity of the bar, one extremity of an auxiliary thick-walled hollow silica bar having an internal diameter roughly the same as the internal diameter of the produced bar, and wherein the mixture of gaseous constituents enters the auxiliary bar via an opposite extremity of the auxiliary bar.

7. Device for producing a preform for optical fibers, comprising:
an oven,
a support,
means for the relative alternate movement of the support with respect to the oven and for controlling the speed of relative movement,
means for holding a thick-walled high geometrical precision hollow silica bar, these holding means being mounted on the support on both sides of the oven so as to allow the bar to traverse oven,
means for synchronous rotation of the holding means, said synchronous rotation means rotating the bar around its axis,
means for controlling a temperature of the oven, said oven being operable to heat the bar to a temperature equal to or above the melting temperature of silica,
means for circulating inside the bar a mixture of gaseous constituents which interact to generate a vitreous coating on an internal wall of the bar, the vitreous coating being used to subsequently form a core of the optical fibers so that, with the aid of the oven and after cleaning of the bar, internal and external thermic glazing of the bar, vapor phase deposition of the vitreous coating in the bar and a collapse of the bar are successively carried out, and
means for cooling the bar downstream of the circulation of the mixture of gaseous constituents, said cooling means comprising a tubular body provided with channels and cooling blades, said tubular body being traversed by the bar, said channels being formed in the tubular body so as to feed a cooling gas into the tubular body.

8. Method according to claim 1, wherein the oven is an induction oven.

9. Method according to claim 8, wherein the induction oven includes a graphite or zircon susceptor.

10. Device according to claim 7, wherein the cooling means are fixed against the oven.

11. Device according to claim 7, wherein the channels are slanted downstream of the circulation of the mixture of gaseous constituents.

12. Method according to claim 1, further comprising a chemical attack of the internal surface of the bar during the thermic glazing step and prior to the depositing step.

13. Method for producing a preform for optical fibers, comprising the steps of:
producing a hollow silica bar,
cleaning the bar, and
using an oven, which is traversed by the bar and heats the bar to a temperature equal to or above a melting temperature of silica and with respect to which the bar undergoes relative movements, for carrying out the following successive operations;
thermic glazing of internal and external surfaces of the bar,
depositing a vitreous coating on the internal surface of the bar by means of a mixture of gaseous constituents which are circulated inside the bar, wherein interaction of the gaseous constituents produces the vitreous coating, said vitreous coating being provided for the subsequent formation of a core of the optical fibers, and
collapsing the bar,
various temperatures of the bar required for the glazing, depositing, and collapsing steps being obtained by varying the relative speed of the bar with respect to the oven.

14. Method according to claim 13, further comprising a chemical attack of the internal surface of the bar after the thermic glazing step and prior to the depositing step.

15. Method according to claim 13, further comprising the step of cooling the bar downstream of the oven.

16. Method according to claim 13, wherein the step of producing the bar includes the steps of machining a cone at one extremity of the bar and along the axis of the bar and wherein the mixture of gaseous constituents enters the bar via an opposite extremity of the bar.

17. Method according to claim 16, wherein, coaxial to the bar at the side of the machined cone, a thin-walled silica tube is connected to the bar, an internal diameter of the tube being equal to a diameter of a large base of the cone.

18. Method according to claim 13, wherein production of the bar is completed by connecting, coaxial to the bar and at one extremity of the bar, one extremity of an auxiliary thick-walled hollow silica bar having an internal diameter roughly the same as the internal diameter of the produced bar, and wherein the mixture of gaseous constituents enters the auxiliary bar via an opposite extremity of the auxiliary bar.

19. Method according to claim 13, wherein the oven is an induction oven.

20. Method according to claim 19, wherein the induction oven includes a graphite or zircon susceptor.

* * * * *